United States Patent
Abeysekera et al.

(10) Patent No.: US 12,192,842 B2
(45) Date of Patent: Jan. 7, 2025

(54) WIRELESS COMMUNICATION SYSTEM, COMMUNICATION CONTROL METHOD, AND COMMUNICATION CONTROL PROGRAM

(71) Applicant: Nippon Telegraph and Telephone Corporation, Tokyo (JP)

(72) Inventors: Hirantha Abeysekera, Musashino (JP); Toshiro Nakahira, Musashino (JP); Shoko Shinohara, Musashino (JP); Koichi Ishihara, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 362 days.

(21) Appl. No.: 17/796,138

(22) PCT Filed: Jan. 28, 2020

(86) PCT No.: PCT/JP2020/002978
§ 371 (c)(1),
(2) Date: Jul. 28, 2022

(87) PCT Pub. No.: WO2021/152692
PCT Pub. Date: Aug. 5, 2021

(65) Prior Publication Data
US 2023/0113366 A1    Apr. 13, 2023

(51) Int. Cl.
*H04W 36/08*    (2009.01)
(52) U.S. Cl.
CPC .................. *H04W 36/08* (2013.01)

(58) Field of Classification Search
CPC ..................................................... H04W 36/08
See application file for complete search history.

(56) References Cited

U.S. PATENT DOCUMENTS

| 10,299,146 | B2* | 5/2019 | Chou | H04W 48/14 |
| 2019/0082447 | A1* | 3/2019 | Harsha | H04W 72/542 |
| 2019/0159205 | A1* | 5/2019 | Mercier | H04W 28/16 |

OTHER PUBLICATIONS

[No Author Listed], "802.11 High Speed Wireless LAN Text," 802.11 High Speed Wireless LAN Text, 3rd Edition, Mar. 2008, 5 pages (with English Translation).

* cited by examiner

*Primary Examiner* — Justin Y Lee
(74) *Attorney, Agent, or Firm* — Fish & Richardson P.C.

(57) ABSTRACT

A wireless communication system includes a plurality of base stations to which terminal stations are connectable, and a base station control device controlling each of the base stations. The base station control device includes an information collection unit collecting wireless environment information indicating wireless environments around the base stations and the terminal stations from each of the base stations, and a policy calculation unit calculating a policy for connecting the base stations and the terminal stations based on the wireless environment information. Each of the base stations includes receiver receiving the calculated policy a destination calculation unit calculating a destination to which a terminal station left unaccommodated is to be connected based on the received policy, and a transmitter transmitting the received policy and the calculated destination to the terminal station. Each of the terminal stations determines a connection destination based on the transmitted policy and transition destination.

12 Claims, 6 Drawing Sheets

WIRELESS COMMUNICATION SYSTEM, COMMUNICATION CONTROL METHOD, AND COMMUNICATION CONTROL PROGRAM

CROSS-REFERENCE TO RELATED APPLICATIONS

This application is a National Stage application under 35 U.S.C. § 371 of International Application No. PCT/JP2020/002978, having an International Filing Date of Jan. 28, 2020, the disclosure of which is considered part of the disclosure of this application, and is incorporated by reference in its entirety into this application.

TECHNICAL FIELD

The present invention relates to a wireless communication system, a communication control method, and a communication control program.

BACKGROUND ART

In recent years, a wide spread of high-performance portable wireless terminals such as notebook computers and smartphones has led a wireless local area network (LAN) which complies with IEEE802.11 standards to be widely used also at home, let alone at companies and in publicly accessible spaces.

The wireless LAN which complies with IEEE802.11 standards includes a wireless LAN complying with IEEE802.11b/g/n standards in which a 2.4 GHz band is used and a wireless LAN complying with IEEE802.11a/n/ac standards in which a 5 GHz band is used.

In the wireless LAN complying with IEEE802.11b standards and IEEE802.11g standards, 13 channels are prepared at intervals of 5 MHz from 2400 MHz to 2483.5 MHz. However, in a case where a plurality of channels are used at the same location, it is possible to use up to three channels or four channels at the same time by using channels so that spectra do not overlap with each other to avoid interference.

In the wireless LAN complying with IEEE802.11a standards, a total of 19 channels including 8 channels and 11 channels which do not overlap with each other are respectively defined between 5170 MHz and 5330 MHz and between 5490 MHz and 5710 MHz in Japan. Note that in IEEE802.11a standards, a band width per channel is fixed at 20 MHz.

Maximum transmission speed of the wireless LAN is 11 Mbps in IEEE802.11b standards and is 54 Mbps in IEEE802.11a standards and IEEE802.11g standards. However, the transmission speed here is transmission speed on a physical layer.

Actually, transmission efficiency in a medium access control (MAC) layer is approximately from 50 to 70%, and thus, an upper limit value of throughput is approximately 5 Mbps in IEEE802.11b standards and is approximately 30 Mbps in IEEE802.11a standards and IEEE802.11g standards. Further, transmission speed further decreases if the number of wireless stations which try to transmit information increases.

Meanwhile, in a wired LAN, as well as a 100 Base-T interface of Ethernet (registered trademark), fiber to the home (FTTH) which uses an optical fiber has been spread also at every home, and high-speed lines on the order of 100 Mbps to 1 Gbps are provided. Thus, further higher transmission speed is desired also in the wireless LAN.

In IEEE802.11n standards for which standardization has been completed in 2009, a channel band width which has been fixed at 20 MHz so far is expanded to up to 40 MHz, and introduction of multiple input multiple output (MIMO) technique is determined. If transmission and reception are performed by applying all functions defined in IEEE802.11n standards, communication speed of up to 600 Mbps can be achieved in a physical layer.

Further, in IEEE802.11ac standards for which standardization has been completed in 2013, it is determined to expand a channel band width to 80 MHz or up to 160 MHz (or 80+80 MHz) and introduce a transmission method of multiuser MIMO (MU-MIMO) in which space division multiple access (SDMA) is applied. If transmission and reception are performed by applying all functions defined in IEEE802.11ac standards, communication speed of up to approximately 6.9 Gbps can be achieved in a physical layer.

Further, in IEEE802.11ax standards which are currently under formulation, orthogonal frequency division multiple access (OFDMA) which enables transmission and reception of frames by dividing channels of 20 MHz, 40 MHz, 80 MHz, 160 MHz and 80+80 MHz described above into finer sub-channels, is expected to be defined. Use of OFDMA enables simultaneous transmission by a plurality of wireless stations in unit of a resource unit by dividing the above-described channels into finer sub-channels. Further, a function of increasing communication opportunities while reducing interference from other peripheral cells by control of a carrier sense threshold (CCA threshold) is expected to be defined in IEEE802.11ax standards.

The wireless LAN complying with IEEE802.11 standards is operated in a frequency band of a 2.4 GHz band or a 5 GHz band for which license is not required. In this event, in a case where a base station complying with IEEE802.11 standards forms a wireless LAN cell (basic service set (BSS)), the base station selects one frequency channel from frequency channels which can be supported at the own station and operates the frequency channel.

A channel to be used at the own cell, setting values of a band width and other parameters, and other parameters which can be supported at the own station are described in a Beacon frame which is periodically transmitted, a Probe response frame for a Probe Request frame received from a wireless terminal, or the like. Further, the base station operates the cell by transmitting a frame on the frequency channel which the base station determines to operate and notifying subordinate wireless terminals and other peripheral wireless stations.

Examples of a method for selecting and setting a frequency channel, a band width and other parameters at the base station can include the following four methods:

(1) a method in which default parameter values set in advance at the base station are used as is,
(2) a method in which values manually set by a user who operates the base station are used,
(3) a method in which parameter values are autonomously selected and set based on wireless environment information detected by each base station upon start-up, and
(4) a method in which parameter values determined by a central control station such as a wireless LAN controller are set.

Further, the number of channels which can be used at the same time at the same location is 3 in a wireless LAN of a 2.4 GHz band, and 2, 4, 9 or 19 in a wireless LAN of a 5 GHz band in accordance with a channel band width to be used for communication. Thus, in a case where a wireless LAN is actually introduced, it is necessary to select a channel to be used by the base station within the own BSS (see, for example, Non-Patent Literature 1).

While the number of channels which can be used at the same time at the same location in a 5 GHz band is 19 channels in a case where the channel band width is 20 MHz, in a case where the channel band width is expanded to 40 MHz, 80 MHz, 160 MHz or 80+80 MHz, the number of channels which can be used at the same time at the same location in a 5 GHz band decreases to 9 channels, 4 channels, and 2 channels. In other words, the number of channels which can be used decreases as the channel band width increases.

In a wireless LAN dense environment where the number of channels which can be used is larger than the number of BSSs, a plurality of BSSs use the same channel (overlapping BSS (OBSS)). Thus, in the wireless LAN, autonomous distributed access control in which data is transmitted only in a case where a channel is available by carrier sense is used using carrier sense multiple access with collision avoidance (CSMA/CA).

Specifically, a wireless station at which a transmission request occurs first performs carrier sense in a predetermined sensing period (distributed inter-frame space (DIFS)) to monitor a state of a wireless medium, and if there is no transmission signal by other wireless stations in this period, performs random back-off. The wireless station continuously performs carrier sense also during a random back-off period, and in a case where there is no transmission signal by other wireless stations also in this period, obtains right to utilize a channel.

Note that whether there is transmission/reception by other wireless stations is determined by whether or not a signal greater than a carrier sense threshold set in advance is received. The wireless station which obtains the right to utilize the channel can transmit data to other wireless stations within the same BSS and can receive data from these other wireless stations.

In a case where such CSMA/CA control is performed, in a wireless LAN dense environment where the same channel is used, a channel becomes busy more frequently by carrier sense, which lowers throughput. It is therefore important to monitor a surrounding environment, select an appropriate channel and select a transmission power value and a carrier sense threshold which enable simultaneous transmission and reception.

Further, a method for selecting the above-described parameters such as a type of 2.4 GHz or 5 GHz which is an operating frequency band of the base station and a channel to be utilized in the operating frequency band is not defined in IEEE802.11 standards, and thus, respective vendors which supply base stations employ individual methods.

CITATION LIST

Non-Patent Literature

Non-Patent Literature 1: supervised by Masahiro Morikura, Shuji Kubota, "802.11 high-speed wireless LAN textbook", revised third edition, Impress R&D, March, 2008

SUMMARY OF THE INVENTION

Technical Problem

However, respective wireless stations select the above-described parameters in an autonomous distributed manner, which makes it impossible to achieve optimization as the whole system, and particularly, in an environment where there are a number of wireless stations, there is a case where user quality largely degrades.

Further, in recent years, the number of wireless stations at which a plurality of wireless modules are mounted has increased. This is because a band width to be used can be expanded and user throughput within a service area can be increased by mounting a plurality of wireless modules in the same chassis and using different frequency bands and different channels.

Further, in an environment where a plurality of wireless stations or wireless modules are operated, while a terminal station needs to select an appropriate wireless station to be connected and connect to the wireless station, factors such as environmental change may force the terminal station to switch the wireless station to which it is being connected.

An object of the present invention is to provide a wireless communication system, a communication control method, and a communication control program, with which degradation of efficiency of wireless communication can be prevented by a terminal station determining a connection destination in an autonomous distributed manner.

Means for Solving the Problem

A wireless communication system according to one aspect of the present invention is a wireless communication system including a plurality of base stations to which terminal stations are connectable, and a base station control device which controls each of the base stations, the base station control device including an information collection unit configured to collect wireless environment information indicating wireless environments around the base stations and the terminal stations from each of the base stations, and a policy calculation unit configured to calculate policy for connecting the base stations and the terminal stations based on the wireless environment information collected by the information collection unit, each of the base stations including a reception unit configured to receive the policy calculated by the policy calculation unit, a transition destination calculation unit configured to calculate a transition destination to which a terminal station left unaccommodated is to be connected, based on the policy received by the reception unit, and a transmission unit configured to transmit the policy received by the reception unit and the transition destination calculated by the transition destination calculation unit to the terminal station, and each of the terminal stations determining a connection destination based on the policy and the transition destination transmitted by each of the base stations.

A communication control method according to one aspect of the present invention is a communication control method for controlling each of a plurality of base stations to which terminal stations are connectable, the communication control method including an information collection step of collecting wireless environment information indicating wireless environments around the base stations and the terminal stations from each of the base stations, a policy calculation step of calculating policy for connecting the base stations and the terminal stations based on the collected wireless environment information, a transition destination calculation step of calculating a transition destination to which a terminal station left unaccommodated by the base stations is to be connected, based on the calculated policy, and a transmission step of transmitting the calculated policy and the calculated transition destination to the terminal station.

Effects of the Invention

According to the present invention, it is possible to prevent degradation of efficiency of wireless communication by a terminal station determining a connection destination in an autonomous distributed manner.

DESCRIPTION OF EMBODIMENTS

Figure 1:
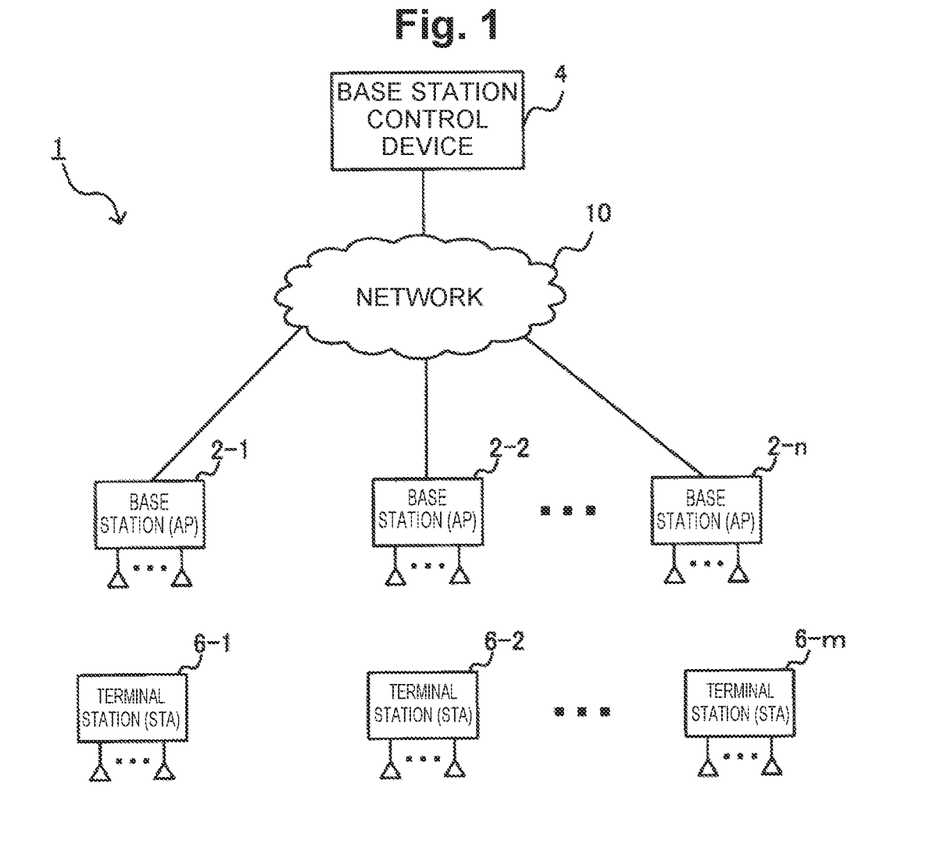
FIG. 1 illustrates a configuration example of a wireless communication system according to one embodiment.

One embodiment of a wireless communication system will be described below using the drawings. FIG. 1 illustrates a configuration example of a wireless communication system 1 according to one embodiment. As illustrated in FIG. 1, the wireless communication system 1 is constituted by, for example, n base stations (APs) 2-1 to 2-n being respectively connected to a base station control device 4 via a network 10. For example, m terminal stations 6-1 to 6-m are located around the base stations 2-1 to 2-n.

Note that while an example of a case will be described where the wireless communication system 1 operates while complying with, for example, IEEE802.11ax standards, the system is not limited to this, and the system may operate while complying with other communication standards. Hereinafter, a component which is not specified among a plurality of components as the base stations 2-1 to 2-n will be simply abbreviated as a base station 2, or the like.

Figure 2:
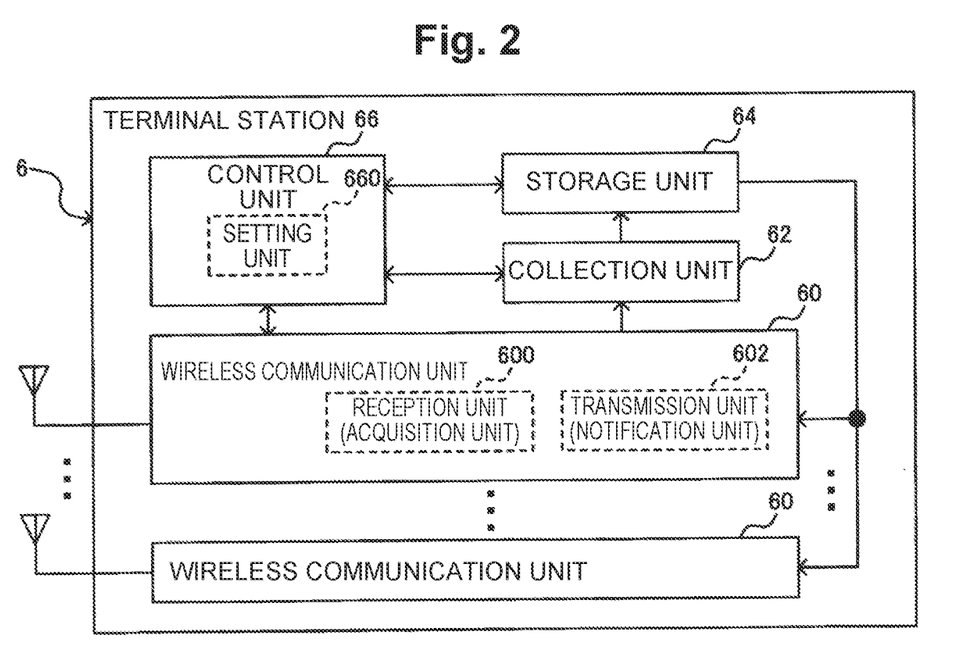
FIG. 2 is a functional block diagram illustrating an example of functions of a terminal station.

The terminal station 6 will be described first. FIG. 2 is a functional block diagram illustrating an example of functions of the terminal station 6. As illustrated in FIG. 2, the terminal station 6 includes, for example, a plurality of wireless communication units 60, a collection unit 62, a storage unit 64, and a control unit 66.

The wireless communication unit 60 includes a reception unit (acquisition unit) 600 and a transmission unit (notification unit) 602 and performs wireless communication with the base station 2 and other terminal stations 6.

The reception unit 600 acquires information by receiving signals transmitted by, for example, the base station 2 and other terminal stations 6 and outputs the information to the collection unit 62. The transmission unit 602 transmits (notifies) information, for example, stored in the storage unit 64 to the base station 2 and other terminal stations 6. Note that the wireless communication units 60 may use different frequency bands or may employ different communication schemes or may perform communication using the same communication scheme.

The collection unit 62 collects wireless environment information, or the like, indicating wireless environments around, for example, the base station 2 and other terminal stations 6 via the wireless communication unit 60 and outputs the wireless environment information, or the like, to the storage unit 64. It is assumed that the wireless environment information includes connection information regarding connection between the base station 2 and the terminal station 6 such as strength of, for example, a received signal strength indicator (RSSI). The storage unit 64 stores the wireless environment information, or the like, collected by the collection unit 62.

The control unit 66 includes a setting unit 660 and controls respective units which constitute the terminal station 6. The setting unit 660 performs setting for operation of the terminal station 6 based on information acquired by the wireless communication unit 60 from the base station 2. For example, the setting unit 660 performs setting so as to determine the base station 2 which becomes a connection destination based on policy and a transition destination which will be described later, transmitted by the base station 2. In other words, the terminal station 6 not only determines a connection destination in an autonomous distributed manner, but also determines the base station 2 to be connected based on the policy and the transition destination transmitted by the base station 2.

Figure 3:
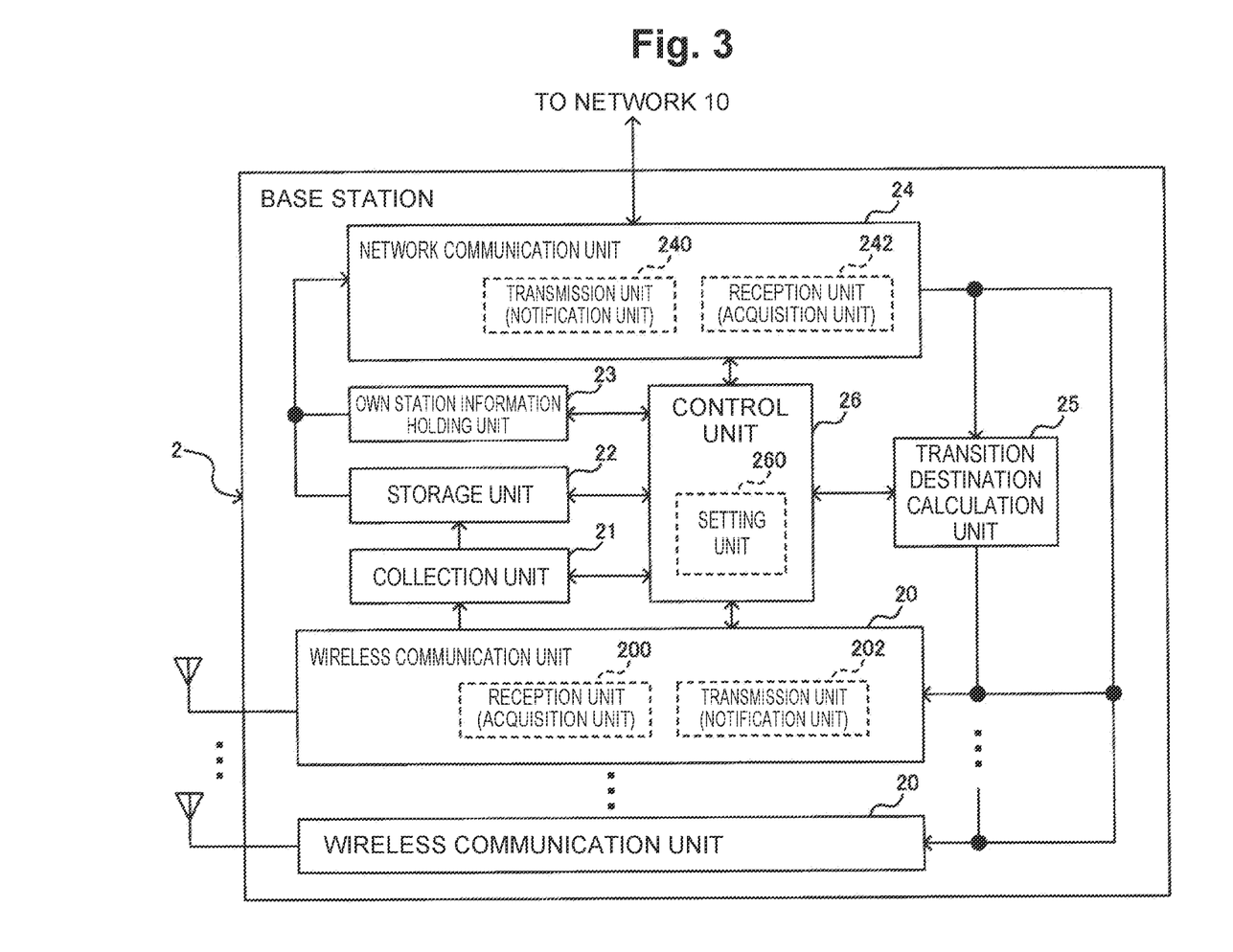
FIG. 3 is a functional block diagram illustrating an example of functions of a base station.

The base station 2 will be described next. FIG. 3 is a functional block diagram illustrating an example of functions of the base station 2. As illustrated in FIG. 3, the base station 2 includes, for example, a plurality of wireless communication units 20, a collection unit 21, a storage unit 22, an own station information holding unit 23, a network communication unit 24, a transition destination calculation unit 25, and a control unit 26.

The wireless communication unit 20 includes a reception unit (acquisition unit) 200 and a transmission unit (notification unit) 202 and performs wireless communication with other base stations 2 and the terminal station 6.

The reception unit 200 acquires information by receiving signals transmitted by, for example, other base stations 2 and the terminal station 6 and outputs the information to the collection unit 21. The transmission unit 202 transmits (notifies) signals indicating, for example, information stored in the storage unit 22, own station information (which will be described later) held by the own station information holding unit 23, information acquired by the network communication unit 24 from the base station control device 4, or the like, to other base stations 2 and the terminal station 6. For example, the transmission unit 202 transmits the policy, the transition destination, a parameter, or the like, which will be described later to the terminal station 6.

Note that the wireless communication units 20 may use different frequency bands or may employ different communication schemes or may perform communication using the same communication scheme. It is assumed here that a wireless communication unit 20 of at least one of the base stations 2-1 to 2-n can perform wireless communication using frequency bands of 5 GHz, 2.4 GHz and 920 MHz (IEEE802.11ah: sub GHz).

The collection unit 21 collects wireless environment information, or the like, including a plurality of information items indicating, for example, wireless environments, or the like, around other base stations 2 and the terminal station 6 from other base stations 2 and the terminal station 6 via the wireless communication units 20 and outputs the wireless environment information, or the like, to the storage unit 22. Note that the wireless environment information includes, for example, information regarding communication and connection between the base station 2 and the terminal station 6 and information regarding an operation state of the base station 2. The storage unit 22 stores the wireless environment information, or the like (including connection information), collected by the collection unit 21.

The own station information holding unit 23 holds information regarding the base station 2. For example, the own station information holding unit 23 holds own station information including specifications, functions, and the like, of the own station, such as a frequency band and a communication scheme to be used by the base station 2, the number of connectable terminal stations and the number of wireless communication units 20.

The network communication unit 24 includes a transmission unit (notification unit) 240 and a reception unit (acquisition unit) 242 and performs wired communication or wireless communication with the base station control device 4 via the network 10.

The transmission unit 240 transmits (notifies) signals indicating, for example, information stored in the storage unit 22, and own station information held by the own station information holding unit 23 to the base station control device 4. The reception unit 242 acquires information (such as, for example, the policy, the parameter, or the like, which will be described later) by receiving the signals transmitted by the base station control device 4 and outputs the information to the transition destination calculation unit 25 and the wireless communication unit 20.

The transition destination calculation unit 25 calculates a base station 2 (transition destination AP: transition destination) which becomes a transition destination to which the terminal station 6 left unaccommodated by the base station 2 is to be connected based on the information (such as, for example, the policy which will be described later) received by the reception unit 242 and outputs a calculation result to the wireless communication unit 20.

Here, the transition destination calculation unit 25 may calculate another base station 2 with the highest signal strength or another base station 2 located closest to the base station 2 as a transition destination. In a case where another base station 2 located closest to the base station 2 is specified, the transition destination calculation unit 25 calculates a distance d(m) between the own station (own AP) and another base station 2 (peripheral APa) using the following expression (1).

[Math. 1]

$$\text{distance } d(m) \text{ between own } AP \text{ and peripheral } APa = 10^{\left(\frac{TxPwr - RxPwr + 147.5 - 20\log_{10}f}{20}\right)} \quad (1)$$

$TxPwr$ = current transmission power value $(dBm)$ of $APa$ $RxPwr$ = received power value $(dBm)$ of $APa$ at own $AP$ $f$ = central frequency (Hz) of current operating channel of $APa$ For example, in a case where TxPwr=23 dBm, RxPwr=−50 dBm, and f=52000 MHz (40 ch), a distance d becomes 20.37 m.

Further, the transition destination calculation unit 25 confirms whether or not there is a wireless communication unit 20 which performs communication in a frequency band specified by the policy transmitted by the base station control device 4 at the base station 2 set as a candidate for the transition destination.

In a case where there is a wireless communication unit 20 which performs communication in a frequency band specified by the policy at the base station 2 set as a candidate for the transition destination, the transition destination calculation unit 25 sets the wireless communication unit 20 as the transition destination.

In a case where there is no wireless communication unit 20 which performs communication in the frequency band specified by the policy at the base station 2 set as a candidate for the transition destination, the transition destination calculation unit 25 repeats calculation while setting another base station 2 as the candidate for the transition destination.

Further, in a case where there are a plurality of base stations 2 which can become candidates for the transition destination, the transition destination calculation unit 25 performs calculation of selecting a transition destination which is set as the candidate for the transition destination by the fewest terminal stations.

The control unit 26, which includes a setting unit 260, controls respective units which constitute the base station 2. For example, the setting unit 260 performs setting for operation of the base station 2 based on information acquired from the base station control device 4 by the network communication unit 24, information acquired from the terminal station 6 by the wireless communication unit 20, or the like. For example, the setting unit 260 sets the policy transmitted by the base station control device 4.

Note that in a case where there is no wireless communication unit 20 which performs communication in the frequency band specified by the policy at all the base stations 2 which are set as candidates for the transition destination by the transition destination calculation unit 25, the setting unit 260 waits for the next opportunity without setting the policy.

Figure 4:
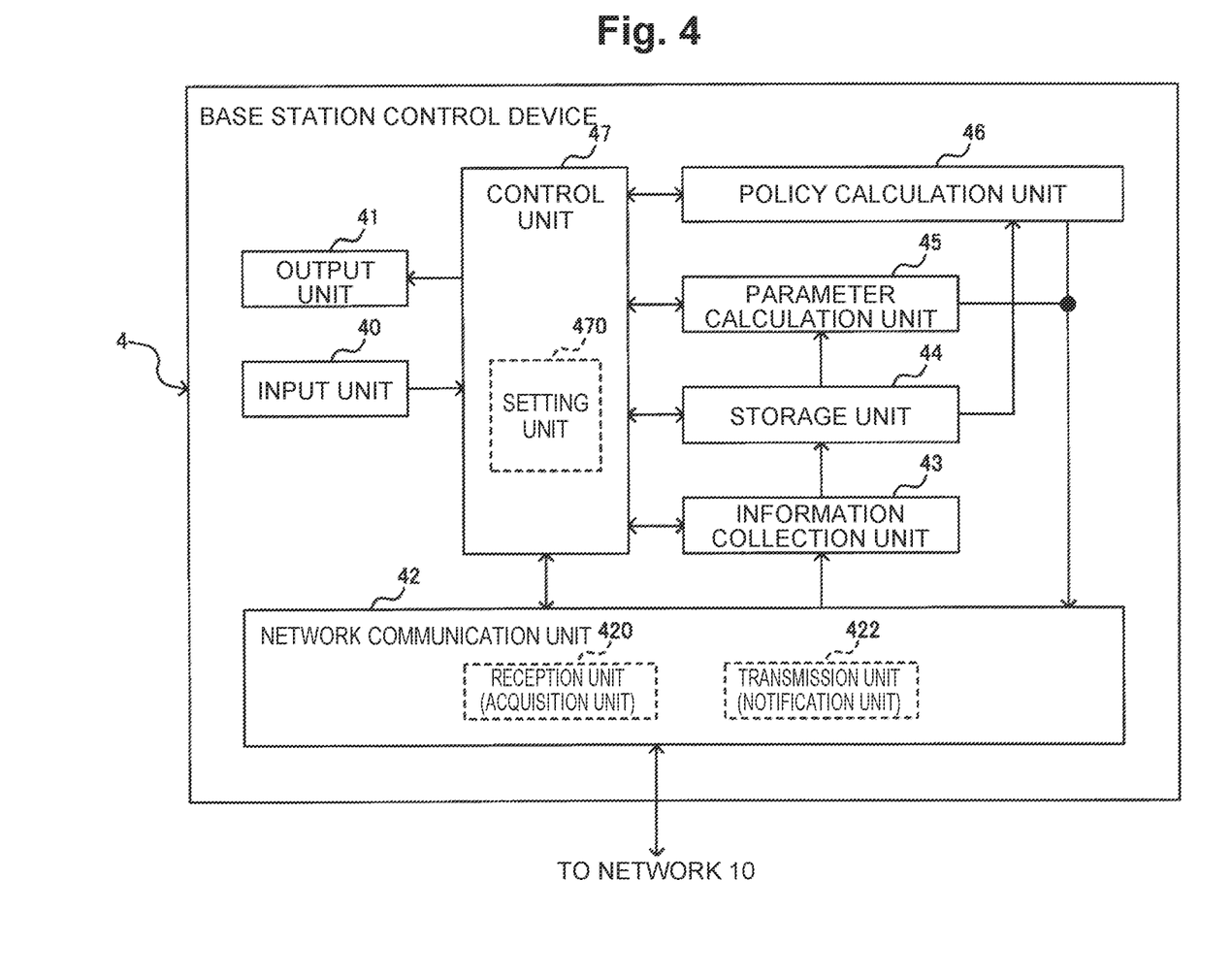
FIG. 4 is a functional block diagram illustrating an example of functions of a base station control device according to one embodiment.

The base station control device 4 will be described next. FIG. 4 is a functional block diagram illustrating an example of functions of the base station control device 4 according to one embodiment. As illustrated in FIG. 4, the base station control device 4 includes, for example, an input unit 40, an output unit 41, a network communication unit 42, an information collection unit 43, a storage unit 44, a parameter calculation unit 45, a policy calculation unit 46, and a control unit 47.

The input unit 40 accepts input (such as instructions and settings) by the worker with respect to the base station control device 4. The output unit 41 outputs results, or the like, of processing by the base station control device 4 to show the results, or the like, to the worker.

The network communication unit 42, which includes a reception unit (acquisition unit) 420 and a transmission unit (notification unit) 422, performs wired communication or wireless communication with the base stations 2-1 to 2-n via the network 10.

The reception unit 420 receives information respectively transmitted by the base stations 2-1 to 2-n and outputs the received information to the information collection unit 43. For example, the reception unit 420 receives wireless environment information, or the like, (including connection information) respectively collected by the base stations 2-1 to 2-n and outputs the wireless environment information, or the like, to the information collection unit 43. The transmission unit 422 transmits information, or the like, processed by the base station control device 4 to the base stations 2-1 to 2-n. For example, the transmission unit 422 transmits the parameter calculated by the parameter calculation unit 45 and the policy calculated by the policy calculation unit 46 to each of the base stations 2-1 to 2-n.

The information collection unit 43 collects the information received by the reception unit 420 and outputs the information to the storage unit 44. For example, the information collection unit 43 collects wireless environment information (including connection information) such as an operation log including a plurality of information items indicating wireless environments around each base station 2 and each terminal station 6 and a connection state from each of the base stations 2-1 to 2-n and causes the collected results to be stored in the storage unit 44.

The information items included in the wireless environment information include, for example, strength of an RSSI, traffic, the number of terminal stations 6 connected to the base station 2 (the number of connected terminals), channel utilization, a data rate, a channel transition log, or the like.

The parameter calculation unit 45 calculates a parameter for correcting radio wave interference relationship among base stations based on the wireless environment information, for example, stored in the storage unit 44 and priority set in advance for each of the base stations 2-1 to 2-n and outputs the calculated parameter to the network communication unit 42.

For example, the parameter calculation unit 45 calculates a parameter to prioritize communication at a base station with higher priority over communication at a base station with lower priority.

The policy calculation unit 46 calculates policy for connecting the base station 2 and the terminal station 6 based on the wireless environment information, or the like, for example, stored in the storage unit 44 and outputs the calculated policy to the network communication unit 42.

For example, the policy calculation unit 46 calculates policy which limits terminal stations 6 to be accommodated by each of the base stations 2 in accordance with functions (for example, supporting communication standards) of each of the terminal stations 6 or whether or not a predetermined condition (for example, an RSSI threshold) is satisfied.

Further, in a case where the base station 2 includes a plurality of wireless communication units 20 which perform wireless communication as described above, the policy calculation unit 46 may calculate a combination, or the like, of policy which allows only other wireless communication units 20 within the base station as transition destinations, policy which also allows other base stations 2 as transition destinations, policy which specifies a frequency band (5 GHz, 2.4 GHz, 920 MHz) of the transition destination, or the like.

Further, in a case where the base station 2 includes a plurality of wireless communication units 20 and one of the wireless communication units 20 can perform communication in a UHF band, and in a case where the policy calculation unit 46 fails to calculate policy which specifies a transition destination in a frequency band higher than the UHF band, the policy calculation unit 46 may calculate policy which takes the wireless communication unit 20 capable of communicating in the UHF band as the transition destination.

The control unit 47, which includes a setting unit 470, controls respective units which constitute the base station control device 4. Further, the control unit 47 causes results obtained by the respective units which constitute the base station control device 4 processing information, to be stored in the storage unit 44.

The setting unit 470 performs setting for the respective units which constitute the base station control device 4. For example, the setting unit 470 performs setting for the information collection unit 43, the parameter calculation unit 45 and the policy calculation unit 46 based on settings input by the worker via the input unit 40.

Figure 5:
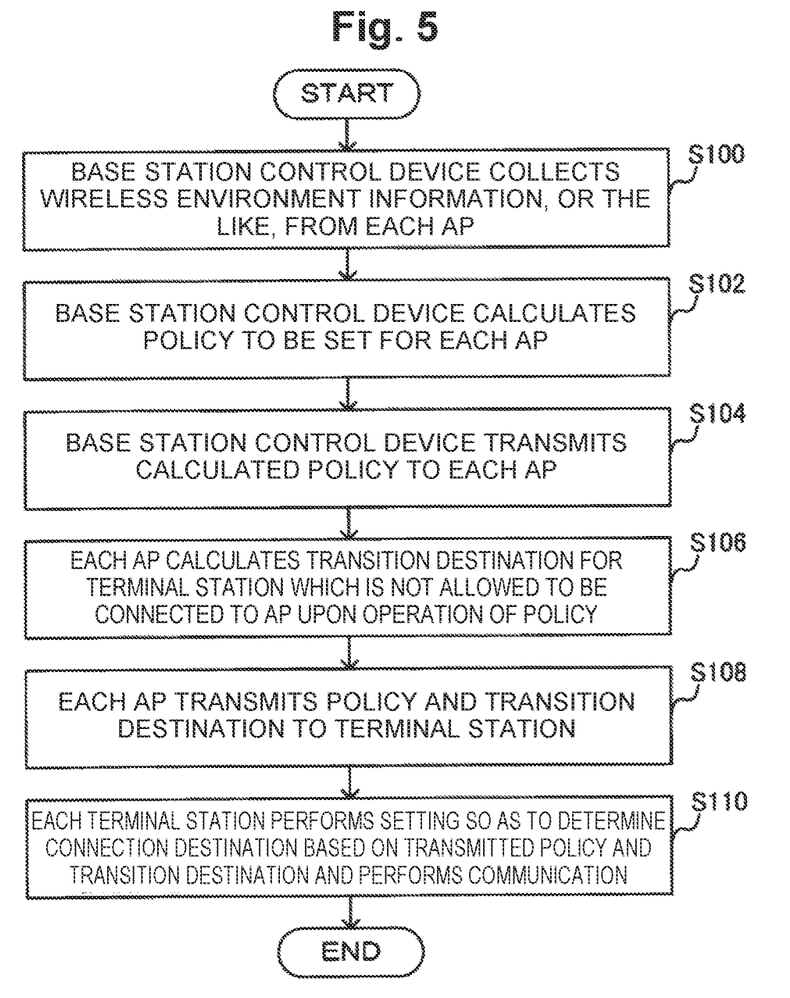
FIG. 5 is a flowchart illustrating an operation example of the wireless communication system according to one embodiment.

An operation example of the wireless communication system 1 will be described next. FIG. 5 is a flowchart illustrating the operation example of the wireless communication system 1. As illustrated in FIG. 5, the base station control device 4 collects wireless environment information, or the like, from each base station (AP) 2 (S100).

Then, the base station control device 4 calculates policy to be set for each base station 2 (S102). Then, the base station control device 4 transmits the calculated policy to each base station 2 (S104).

Each base station 2 calculates a transition destination for the terminal station 6 which fails to be connected to the base station 2 upon operation of the policy (S106). Then, each base station 2 transmits the policy and the transition destination to the terminal station 6 (S108).

Then, each terminal station 6 performs setting so as to determine a connection destination based on the transmitted policy and transition destination and performs communication (S110).

In this manner, in the wireless communication system 1, the terminal station 6 determines a connection destination based on the policy calculated by the base station control device 4 and the transition destination calculated by the base station 2, so that it is possible to prevent degradation of efficiency of wireless communication due to the terminal station 6 determining the connection destination in an autonomous distributed manner.

Note that part or all of respective functions of the base station 2, the base station control device 4 and the terminal station 6 may be implemented with hardware such as a programmable logic device (PLD) and a field programmable gate array (FPGA) or may be implemented as a program to be executed by a processor such as a CPU.

For example, the base station control device 4 according to the present invention can be implemented using a computer and a program, and the program can be recorded in a storage medium or can be provided through a network.

Figure 6:
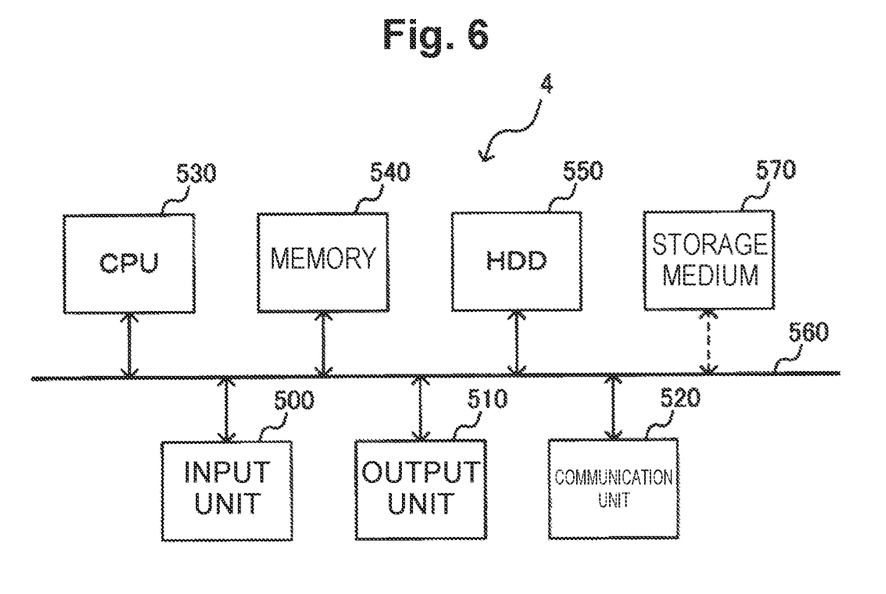
FIG. 6 illustrates a hardware configuration example of the base station control device according to one embodiment.

FIG. 6 illustrates a hardware configuration example of the base station control device 4 (the base station 2, the terminal station 6) according to one embodiment. As illustrated in FIG. 6, for example, the base station control device 4, to which an input unit 500, an output unit 510, a communication unit 520, a CPU 530, a memory 540 and an HDD 550 are connected via a bus 560, has functions as a computer. Further, the base station control device 4 can input/output data to/from a computer-readable storage medium 570.

The input unit 500 is, for example, a keyboard, a mouse, or the like. The output unit 510 is, for example, a display device such as a display. The communication unit 520, which is, for example, a wired or wireless network interface, can perform a plurality of wireless communications.

The CPU 530 controls respective units which constitute the base station control device 4 and performs calculation, or the like, described above. The memory 540 and the HDD 550 constitute the storage unit 44 described above which stores data. Particularly, the memory 540 stores respective pieces of data to be used for calculation described above. The storage medium 570 can store a wireless communication program, or the like, for executing functions of the base station control device 4. Note that architecture constituting the base station control device 4 (the base station 2, the terminal station 6) is not limited to the example illustrated in FIG. 6.

In other words, it is assumed that the "computer" described here includes hardware such as an OS and peripheral equipment. Further, the "computer-readable storage medium" indicates a storage device such as a portable medium such as a flexible disk, a magnetooptical disk, a ROM and a CD-ROM.

Further, the "computer-readable storage medium" may include a medium which dynamically holds a program in a short period, such as a communication line in a case where a program is transmitted via a network such as the Internet or a communication line such as a telephone line, and a medium which holds a program in a certain period, such as a volatile memory inside a computer which becomes a server or a client in that case.

While the embodiment of the present invention has been described above with reference to the drawings, the above-described embodiment is merely an example of the present invention, and it is obvious that the present invention is not limited to the above-described embodiment. Thus, components may be added, omitted, replaced, or changed within a range not deviating from the technical idea and the scope of the present invention.

REFERENCE SIGNS LIST

1 Wireless communication system
2-1 to 2-n Base station
4 Base station control device
6-1 to 6-m Terminal station
20 Wireless communication unit
21 Collection unit
22 Storage unit
23 Own station information holding unit
24 Network communication unit
25 Transition destination calculation unit
26 Control unit
40 Input unit
41 Output unit
42 Network communication unit
43 Information collection unit
44 Storage unit
45 Parameter calculation unit
46 Policy calculation unit
47 Control unit
60 Wireless communication unit
62 Collection unit
64 Storage unit
66 Control unit
200, 242, 420, 600 Reception unit (acquisition unit)
202, 240, 422, 602 Transmission unit (notification unit)
260, 470, 660 Setting unit
500 Input unit
510 Output unit
520 Communication unit
530 CPU
540 Memory
550 HDD
560 Bus
570 Storage medium

The invention claimed is:

1. A wireless communication system comprising:
a plurality of base stations to which one or more terminal stations are connectable; and
a base station control device, implemented using one or more computing devices, configured to control each of the plurality of base stations,
wherein the base station control device comprises:
an information collection unit implemented using one or more computing devices, configured to collect from each of the plurality of base stations, wireless environment information indicating wireless environments around the plurality of base stations and the one or more terminal stations; and
a policy calculation unit implemented using one or more computing devices, configured to calculate a policy for connecting the plurality of base stations and the one or more terminal stations based on the wireless environment information collected by the information collection unit,
wherein each of the plurality of base stations comprises:
a receiver configured to receive the policy calculated by the policy calculation unit;
a transition destination calculation unit, implemented using one or more computing devices, configured to calculate a transition destination to which a terminal station left unaccommodated is to be connected, based on the policy received by the receiver; and
a transmitter configured to transmit the policy received by the receiver and the transition destination calculated by the transition destination calculation unit to the terminal station left unaccommodated, and
wherein each of the one or more terminal stations is configured to determine a connection destination based on the policy and the transition destination transmitted by each of the plurality of base stations.

2. The wireless communication system according to claim 1,
wherein, based on each of the plurality of base stations including a plurality of wireless communication units configured to perform wireless communication, the policy calculation unit is configured to calculate a first policy allowing only other wireless communication units within the base station as transition destinations, a second policy allowing other base stations as transition destinations, or a policy specifying a frequency band of a transition destination.

3. The wireless communication system according to claim 1,
wherein the transition destination calculation unit is configured to calculate another base station with the highest signal strength or another base station located closest to the base station as a transition destination.

4. The wireless communication system according to claim 1,
wherein, based on (i) each of the plurality of base stations including a plurality of wireless communication units configured to perform wireless communication, (ii) one of the plurality of wireless communication units performing communication in an ultra high frequency (UHF) band, and (iii) the policy calculation unit failing to calculate a policy specifying a transition destination in a frequency band higher than the UHF band, the policy calculation unit is configured to calculate a policy taking the wireless communication unit capable of communicating in the UHF band as a transition destination.

5. A communication control method for controlling each of a plurality of base stations to which one or more terminal stations are connectable, the communication control method comprising:
collecting, from each of the plurality of base stations, wireless environment information indicating wireless environments around the plurality of base stations and the one or more terminal stations;

calculating a policy for connecting the plurality of base stations and the one or more terminal stations based on the collected wireless environment information;

calculating a transition destination to which a terminal station left unaccommodated by the base stations is to be connected, based on the calculated policy; and transmitting the calculated policy and the calculated transition destination to the terminal station left un accommodated.

6. The communication control method according to claim 5, further comprising:

based on each of the plurality of base stations including a plurality of wireless communication units configured to perform wireless communication, calculating a first policy allowing only other wireless communication units within the base station as transition destinations, a second policy allowing other base stations as transition destinations, or a policy specifying a frequency band of a transition destination.

7. The communication control method according to claim 5, further comprising:

calculating another base station with the highest signal strength or another base station located closest to the base station as a transition destination.

8. The communication control method according to claim 5, further comprising:

based on (i) each of the plurality of base stations including a plurality of wireless communication units configured to perform wireless communication, (ii) one of the plurality of wireless communication units performing communication in an ultra high frequency (UHF) band, and (iii) calculating a policy specifying a transition destination in a frequency band higher than the UHF band being failed, calculating a policy taking the wireless communication unit capable of communicating in the UHF band as a transition destination.

9. A non-transitory computer readable medium having stored thereon a communication control program for causing a computer to execute operations comprising:

collecting, from each of a plurality of base stations, wireless environment information indicating wireless environments around the plurality of base stations and one or more terminal stations;

calculating a policy for connecting the plurality of base stations and the one or more terminal stations based on the collected wireless environment information;

calculating a transition destination to which a terminal station left unaccommodated by the base stations is to be connected, based on the calculated policy; and transmitting the calculated policy and the calculated transition destination to the terminal station left un accommodated.

10. The non-transitory computer readable medium according to claim 9, wherein the operations further comprise:

based on each of the plurality of base stations including a plurality of wireless communication units configured to perform wireless communication, calculating a first policy allowing only other wireless communication units within the base station as transition destinations, a second policy allowing other base stations as transition destinations, or a policy specifying a frequency band of a transition destination.

11. The non-transitory computer readable medium according to claim 9, wherein the operations further comprise:

calculating another base station with the highest signal strength or another base station located closest to the base station as a transition destination.

12. The non-transitory computer readable medium according to claim 9, wherein the operations further comprise:

based on (i) each of the plurality of base stations including a plurality of wireless communication units configured to perform wireless communication, (ii) one of the plurality of wireless communication units performing communication in an ultra high frequency (UHF) band, and (iii) calculating a policy specifying a transition destination in a frequency band higher than the UHF band being failed, calculating a policy taking the wireless communication unit capable of communicating in the UHF band as a transition destination.

* * * * *